(12) United States Patent
Sampath et al.

(10) Patent No.: US 8,644,338 B2
(45) Date of Patent: Feb. 4, 2014

(54) UNBUNDLING PACKETS RECEIVED IN WIRELESS COMMUNICATIONS

(75) Inventors: Ashwin Sampath, Skillman, NJ (US); Siddharth Ray, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 12/652,665

(22) Filed: Jan. 5, 2010

(65) Prior Publication Data

US 2010/0208654 A1   Aug. 19, 2010

Related U.S. Application Data

(60) Provisional application No. 61/143,142, filed on Jan. 7, 2009.

(51) Int. Cl.
*H04J 3/16* (2006.01)
(52) U.S. Cl.
USPC .......................................... 370/469; 709/239
(58) Field of Classification Search
USPC ................... 370/469, 328; 709/239
See application file for complete search history.

(56) References Cited

U.S. PATENT DOCUMENTS

| | | | |
|---|---|---|---|
| 7,571,358 B2 | 8/2009 | Yi et al. | |
| 8,331,399 B2 | 12/2012 | Meylan | |
| 2005/0238051 A1* | 10/2005 | Yi et al. | 370/469 |
| 2007/0121540 A1 | 5/2007 | Sharp et al. | |
| 2007/0253447 A1* | 11/2007 | Jiang | 370/474 |
| 2008/0031253 A1* | 2/2008 | Kim et al. | 370/393 |
| 2008/0170531 A1 | 7/2008 | Petry et al. | |
| 2008/0188224 A1 | 8/2008 | Pani et al. | |
| 2009/0046626 A1 | 2/2009 | Shao et al. | |
| 2009/0086659 A1 | 4/2009 | Pani et al. | |
| 2009/0086853 A1 | 4/2009 | Ye | |
| 2009/0092079 A1 | 4/2009 | Marinier et al. | |

(Continued)

FOREIGN PATENT DOCUMENTS

| | | |
|---|---|---|
| CN | 101170390 A | 4/2008 |
| CN | 101175024 A | 5/2008 |

(Continued)

OTHER PUBLICATIONS

International Search Report and Written Opinion—PCT/US2010/020379, International Search Authority, European Patent Office Mar. 25, 2010.

(Continued)

*Primary Examiner* — Wei Zhao
(74) *Attorney, Agent, or Firm* — Nerrie M. Zohn

(57) ABSTRACT

Systems and methodologies are described that facilitate unbundling and processing partial packet data units (PDU). PDUs can be transmitted at a communication layer and can include partial PDUs of a disparate communication layer. Complete SDUs can be determined in the partial PDU and provided to an upper communication layer. In addition, however, the partial PDU can comprise a partial SDU. Upon receiving a remaining or additional portion of the partial PDU, a remaining or additional portion of the partial SDU can be combined with the partial SDU to create a complete SDU (or a larger portion thereof). Where a complete SDU is created, it can be provided to an upper communication layer. Alternatively, the partial PDU can be combined with the remaining portion of the partial PDU to generate a complete or larger PDU, from which the previously incomplete SDU can be retrieved and provided to an upper communication layer.

30 Claims, 13 Drawing Sheets

(56) References Cited

U.S. PATENT DOCUMENTS

| | | | |
|---|---|---|---|
| 2009/0185477 A1* | 7/2009 | Lee et al. | 370/216 |
| 2009/0290598 A1 | 11/2009 | Pani et al. | |
| 2009/0323671 A1 | 12/2009 | Wu | |
| 2010/0135212 A1 | 6/2010 | Ho et al. | |
| 2010/0135326 A1 | 6/2010 | Ray et al. | |
| 2010/0158044 A1 | 6/2010 | Ray et al. | |
| 2010/0189059 A1 | 7/2010 | Yang | |
| 2010/0208632 A1 | 8/2010 | Ray et al. | |

FOREIGN PATENT DOCUMENTS

| | | |
|---|---|---|
| CN | 101330492 A | 12/2008 |
| EP | 1119948 A1 | 8/2001 |
| JP | 2002527945 A | 8/2002 |
| JP | 2008113095 A | 5/2008 |
| JP | 2009509432 A | 3/2009 |
| JP | 2010508754 A | 3/2010 |
| WO | WO-0021253 A1 | 4/2000 |
| WO | WO-2007039023 A1 | 4/2007 |
| WO | WO-2008041596 A1 | 4/2008 |
| WO | WO-2008049472 A1 | 5/2008 |
| WO | WO-2008084992 A1 | 7/2008 |
| WO | WO-2008154816 A1 | 12/2008 |
| WO | WO-2009122831 A1 | 10/2009 |

OTHER PUBLICATIONS

Motorola: "Introduction of new MAC-ehs test cases" 3GPP Draft; R5-073408, 3rd Generation Partnership Project (3GPP), Mobile Competence Centre ; 650, Route Des Lucioles ; F-06921 Sophia-Antipolis Cedex; France, vol. RAN WG5, No. Jeju; 20071109, Nov. 9, 2007, XP050186230 [retrieved on Nov. 9, 2007].
"Universal Mobile Telecommunications System (UMTS); Medium Access Control (MAC) protocol specification (3GPP TS 25.321 version 7.7.0 Release 7); ETSI TS 125 321" ETSI Standards, LIS, Sophia Antipolis Cedex, France, vol. 3-R2, No. V7.7.0, Jan. 1, 2008, XP014040632, ISSN: 0000-0001.
3GPP TS 36.322, "3rd Generation Partnership Project;Technical Specification Group Radio Access Network;Evolved Universal Terrestrial Radio Access (E-UTRA) Radio Link Control (RLC) protocol specification (Release 9)", version 9.0.0., Sections 5.1.2.2.3 and 5.1.3.2.3 , Dec. 2009.
3GPP TS 36.322, "3rd Generation Partnership Project;Technical Specification Group Radio Access Network;Evolved Universal Terrestrial Radio Access (E-UTRA)Radio Link Control (RLC) protocol specification (Release 8)", V8.1.0 (V), Sections 5.1.2.2.3 and 5.1.3.2.3, Mar. 2008.
3GPP TS 36.322, "3rd Generation Partnership Project;Technical Specification Group Radio Access Network;Evolved Universal Terrestrial Radio Access (E-UTRA)Radio Link Control (RLC) protocol specification(Release 8)", V8.0.0, 5.1.2 and 5.1.3, Dec. 2007.
3GPP: "Technical Specification Group Radio Access Network; Radio Link Control (RLC) protocol specification (Release 7)", 3rd Generation Partnership Project; 3GPP TS 25.322 V7.7.0 (May 2008), Sophia Antipolis Valbonne, May 31, 2008, pp. 1-82.
Alcatel-Lucent: "Comparison of different SN handling at Layer 2" 3GPP DRAFT; R2073455 Comparison of Different SN Handling At Layer 2, SRD Generation Partnership Project (3GPP), Mobile Competence Centre; 650, Route Des Lucioles; F-06921 Sophia-Antipolis Cedex; France, vol. RAN WG2, No. Athens, Greece; Aug. 15, 2007, XP050136160 p. 1-p. 2 p. 5-p. 6.
Ericsson: "Configurable values for the minimum and maximum RLC PDU size", 3GPP DRAFT; R2-081505, 3RD Generation Partnership Project (3GPP), Mobile Competence Centre; 650, Route Des Lucioles; F-06921 Sophia-Antipolis Cedex; France, vol. RAN WG2, No. Shenzhen, China; Mar. 24, 2008, XP050139246.
Ericsson: "Configurable values for the minimum and maximum RLC PDU size", 3GPP Draft; R2-082771, 3RD Generation Partnership Project (3GPP), Mobile Competence Centre; 650, Route Des Lucioles; F-06921 Sophia-Antipolis Cedex; France, vol. RAN WG2, No. Kansas City, USA; May 9, 2008, XP050140357.
RLC SDU larger than 2047 octets, 3GPP TSG RAN WG2 #64 meeting R2-086818, Nov. 10-14, 2008, Prague, Czech Republic, Source: Panasonic.
Taiwan Search Report—TW099100304—TIPO—Apr. 1, 2013.
Taiwan Search Report—TW099100304—TIPO—Jul. 29, 2013.
Universal Mobile Telecommunications System (UMTS); Radio Link Control (RLC) protocol specification (3GPP TS 25.322 version 7.7.0 Release 7); ETSI TS 125 322, ETSI'Standard, European Telecommunications Standards Institute (ETSI), Sophia.Antipolis Cedex, France, vol. 3-R2, No. V7.7.0, Jul. 1, 2008, XP014042118.

* cited by examiner

US 8,644,338 B2

UNBUNDLING PACKETS RECEIVED IN WIRELESS COMMUNICATIONS

CROSS-REFERENCE

This application claims the benefit of U.S. Provisional Application Ser. No. 61/143,142, filed Jan. 7, 2009, and entitled "A METHOD AND APPARATUS FOR BUNDLING MULTIPLE IP PACKETS IN A WIRELESS COMMUNICATION SYSTEM," the entirety of which is incorporated herein by reference.

BACKGROUND

I. Field

The present disclosure relates generally to wireless communications and more specifically to unbundling service data units (SDU) received in one or more packet data units (PDU).

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

As wireless communication technology develops and devices become more versatile with respect to receiving and processing different types of data, bandwidth demands for device communications increase, especially for just-in-time processing. This increase is caused by requiring larger numbers of packets to be delivered to devices in the same period of time. Currently, packet data convergence protocol (PDCP) packet data units (PDU) can contain only one IP packet, which results in radio link control (RLC) layer complexity increasing as packet rate increases. In addition, PDCP service data units (SDU) inside an RLC PDU are ciphered with different crypto-syncs, resulting in PDCP complexity increasing due to multiple ciphering engine calls. Thus, receiving and processing the larger numbers of packets consumes additional power resulting in decreased device performance and battery life. In addition, there can be absolute time budgets for PDCP and RLC that become difficult to meet with an increasing number of IP packets to transmit.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating bundling and unbundling of packets transmitted over one or more communication layers. In this regard, a small number of large packets can be communicated between devices in a wireless network, as opposed to a large number of small packets. Thus, the additional overhead of reading headers, ciphering packets, etc. can be lessened for a given communication resulting in increased device efficiency. For example, packet data units (PDU) at a first communication layer can be extended to allow bundling of multiple second communication layer PDUs or portions thereof. In this example, PDUs of the second communication layer received over the PDUs of the first layer can be unbundled and related service data units (SDU) of the second communication layer can be retrieved and provided to an upper layer. In one example, complete SDUs in a received partial PDU are forwarded to the upper layer, though the partial PDU can also include a partial SDU. Once another portion of the PDU of the second layer (e.g., a remaining or complete portion) is received in a subsequent PDU of the first layer, a partial SDU in the new portion of the PDU can be combined with the partial SDU of the first received partial PDU to construct a complete SDU (or a larger portion thereof). Once the complete SDU is constructed, it can also be provided to the upper communication layer.

In another example, the complete PDU can be constructed at the second communication layer from the partial PDU and one or more subsequently received portions of the PDU in one or more PDUs of the first communication layer. As the partial PDU is constructed resulting in additional complete SDUs, the complete SDUs can be forwarded to the upper communication layer. In either case, increased device efficiency is provided by allowing transmission of partial PDUs and processing complete SDUs without waiting for remaining portions of incomplete PDUs. Moreover, in one example, the first communication layer can be a radio link control (RLC) or similar layer, and the second communication layer can be a packet data convergence protocol (PDCP) or similar layer.

According to related aspects, a method is provided that includes receiving a PDU at a communication layer comprising a partial PDU related to a disparate communication layer. The method also includes extracting the partial PDU from the PDU at the communication layer and providing one or more complete SDUs in the partial PDU to an upper communication layer.

Another aspect relates to a wireless communications apparatus. The wireless communications apparatus can include at least one processor configured to obtain a PDU from a device at a communication layer that includes an incomplete portion of a PDU related to a disparate communication layer and provision one or more SDUs in the incomplete portion of the PDU to an upper communication layer. The at least one processor is further configured to receive an additional portion of the incomplete portion of the PDU in a disparate PDU from the device at the communication layer. The wireless communications apparatus also comprises a memory coupled to the at least one processor.

Yet another aspect relates to an apparatus. The apparatus includes means for receiving a PDU from a device at a communication layer that includes an incomplete portion of a PDU related to a disparate communication layer and means for extracting the incomplete portion of the PDU from the PDU received from the device at the communication layer. The apparatus further includes means for providing one or more SDUs in the incomplete portion of the PDU to an upper communication layer.

Still another aspect relates to a computer program product, which can have a computer-readable medium including code for causing at least one computer to receive a PDU at a communication layer comprising a partial PDU related to a disparate communication layer. The computer-readable medium can also comprise code for causing the at least one computer to extract the partial PDU from the PDU at the communication layer and code for causing the at least one computer to provide one or more complete SDUs in the partial PDU to an upper communication layer.

Moreover, an additional aspect relates to a PDU receiving component that obtains a PDU from a device at a communication layer that includes an incomplete portion of a PDU related to a disparate communication layer and a PDU unbundling component that extracts the incomplete portion of the PDU from the PDU received from the device at the communication layer. The apparatus can further include a SDU providing component that communicates one or more SDUs in the incomplete portion of the PDU to an upper communication layer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
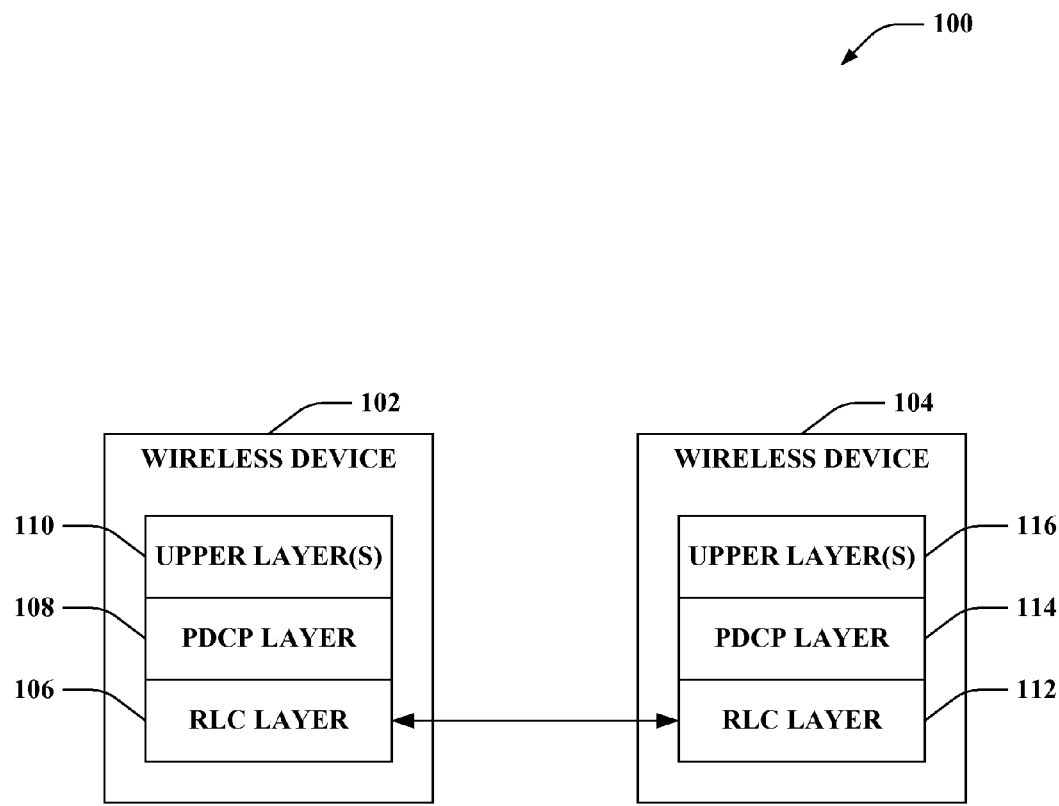
FIG. 1 is a block diagram of a system for bundling and unbundling partial packet data units (PDU).

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates bundling and unbundling of multiple packet data convergence protocol (PDCP) service data units (SDU) in a single PDCP packet data unit (PDU). Wireless network 100 includes wireless devices 102 and 104 that communicate with one another over a wireless network. In one example, wireless device 102 and/or 104 can be an access point, such as a macrocell access point, femtocell or picocell access point, eNB, mobile base station, a portion thereof, and/or substantially any device that provides access to a wireless network. In another example, wireless devices 102 and/or 104 can be a mobile device, such as a UE, a portion thereof, and/or substantially any device that receives access to a wireless network.

Wireless device 102 can comprise multiple communications layers to facilitate transmitting/receiving data with wireless device 104. For example, wireless device 102 can include a radio link control (RLC) layer 106 that transmits and/or receives RLC communications to/from one or more wireless devices, a PDCP layer 108 that retrieves PDCP PDUs from and/or provides PDCP PDUs to the RLC layer 106 where the PDUs comprise one or more PDCP SDUs, and one or more upper layer(s) 110 that can receive the PDCP SDUs from PDCP layer 108 and/or provide packets to the PDCP layer 108 for bundling and transmission to one or more wireless devices. Similarly, wireless device 104 can include an RLC layer 112, PDCP layer 114, and upper layer(s) 116 that provide the same or similar functionality. For example, an SDU can be utilized for transmitted upper layer packets; thus, for example, an SDU can comprise one or more of the upper layer packets or portions thereof. A PDCP PDU can comprise one or more SDUs, and an RLC PDU can comprise one or more PDCP PDUs or portions thereof.

According to an example, upper layer(s) 110 can generate or otherwise receive packets for transmitting to one or more devices. For example, upper layer(s) 110 can include an application layer, internet protocol (IP) layer, and/or the like. PDCP layer 108 can receive the packet from upper layer(s) 110 and can generate one or more PDCP SDUs for transmitting the packets. PDCP layer 108 can additionally create a PDCP PDU, which can comprise one or more of the PDCP SDUs along with a header that includes at least a sequence number related to the one or more PDCP SDUs. PDCP layer 108 can provide the PDCP PDU to RLC layer 106, which can place one or more PDCP PDUs, or portions thereof, in an RLC PDU along with an RLC header, and transmit the RLC PDU to wireless device 104. RLC layer 112 can receive the RLC PDU from wireless device 102.

In one example, RLC layer 112 can deliver partial PDCP PDUs comprised within the RLC PDU to the PDCP layer 114. In this regard, the partial PDCP PDUs can comprise partial PDCP SDUs. As described, for example, PDCP layer 114 can reassemble partial PDCP SDUs received when subsequent PDCP PDUs that comprise portions of SDUs that complete the partial PDCP SDUs are received. In another example, RLC layer 112 can redeliver previous partial PDCP PDUs as complete (or further completed partial) PDCP PDUs upon receiving another portion (e.g., a remaining portion) of the previous partial PDCP PDU. In either example, PDCP layer 114 can extract complete PDCP SDUs and provide the complete SDUs, and/or one or more related packets, to the upper layer(s) 116.

In this regard, multiple PDCP PDUs and/or portions thereof can be received in single RLC PDUs providing for efficient transmission and receipt of complete PDCP SDUs in the PDCP PDUs and/or portions for increased packet rates. This is so because the partial PDCP PDUs can be processed by providing complete PDCP SDUs to upper layers without waiting for the complete PDCP PDU. When other portions of the PDCP PDU are received in the RLC PDU, additional complete SDUs, whether reassembled from PDCP PDU portions or otherwise, can be provided to the upper layers. It is to be appreciated that other layers can utilize the concepts described herein to bundle and unbundle packets for more efficient transmission/receiving thereof. For example, 3GPP, 3GPP LTE, UMTS, CDMA, WiMAX, WiFi, and/or other technologies can utilize the concepts presented herein at one or more communications layers to efficiently transmit multiple PDUs and/or portions thereof in a lower layer PDU.

Figure 2:
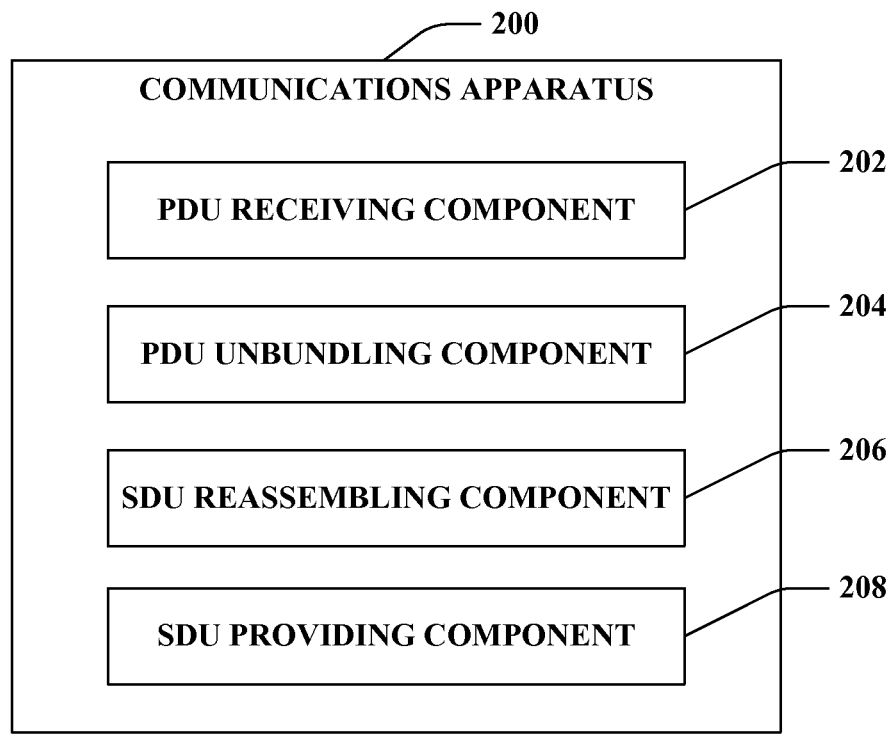
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point, a mobile device, a portion thereof, or substantially any device that receives communications in a wireless network. The communications apparatus 200 can include a PDU receiving component 202 that obtains a PDU from one or more devices (not shown) in a wireless network, a PDU unbundling component 204 that extracts one or more SDUs from the PDU, an SDU reassembling component 206 that combines portions of received SDUs into one or more complete SDUs, and an SDU providing component 208 that transmits the complete SDUs to one or more upper communication layers for processing thereof.

According to an example, PDU receiving component 202 can obtain a PDU, or a portion thereof, transmitted by one or more devices, and the PDU can comprise a plurality of SDUs or portions thereof. In addition, the PDU can comprise one or more headers that include sequence numbers for SDUs or SDU portions following the header to facilitate in-order SDU delivery, for example. PDU unbundling component 204 can extract one or more SDUs or portions thereof from the PDU or portion thereof, and where one or more of the SDUs are entire SDUs, SDU providing component 208 can provision the entire SDUs to an upper layer for processing. Where a portion of an SDU is retrieved by PDU unbundling component 204 from a portion of a PDU, for example, if a beginning portion of the SDU is previously received (e.g., at the end of a previous PDU portion), SDU reassembling component 206 can create an entire SDU from the portions (or a larger partial PDU if the remaining portion of the SDU is not received). Where an entire SDU is constructed from the portions, SDU providing component 208 can transmit the entire SDU to the upper layers.

Similarly, in this regard, where the SDU extracted by PDU unbundling component 204 from the PDU portion has no matching portion (e.g., the portion of the SDU is extracted from the end of the PDU portion), PDU receiving component 202 can obtain a next portion of the PDU (a remaining portion, in one example) from the one or more devices that includes the remainder of the portion of the SDU (e.g., as the first SDU portion in the PDU). PDU unbundling component 204 can retrieve the remaining portion from the PDU, and SDU reassembling component 206 can combine the portions to create an entire SDU, which SDU providing component 208 can transmit to upper layers for processing. It is to be appreciated that PDU receiving component 202 can also receive at least a portion of a disparate PDU along with the next portion of the PDU.

In another example, however, PDU receiving component 202 can receive PDUs or portions thereof with complete SDUs such that reassembly is not required (and thus neither is SDU reassembling component 206). In this example, PDU receiving component 202 can obtain a PDU or a PDU portion with one or more SDUs or portions thereof from a lower communication layer. PDU unbundling component 204 can extract entire SDUs from the PDU or PDU portion ignoring any SDU portions. Subsequently, PDU receiving component 202 can obtain the entire PDU (or a larger portion) from the lower communication layer, which comprises the complete SDU for which a portion was previously received. SDU providing component 208 can transmit the complete SDU for which the portion was previously received to upper layers. In one example, the PDU can also include the previously received entire SDUs such that PDU receiving component 202 can receive a complete PDU following receipt of a PDU portion. Thus, as described, SDU providing component 208 can provide the entire SDUs received in the PDU portion upon receiving the portion to the upper layers and subsequently provide entire SDUs from the entire PDU that were previously received only in part to facilitate efficient receipt and processing of the SDUs.

In an example, PDU receiving component 202 can receive PDCP PDUs from an RLC layer of communications apparatus 200. Thus, PDU unbundling component 204, in this example, can unbundle the PDCP PDUs into PDCP SDUs or related portions, as described. Once PDCP SDU portions are received in their entirety, SDU providing component 208 can transmit the PDCP SDUs to upper layers, as described. It is to be appreciated that other protocol layers in other technologies can exploit similar functionality to provide efficient receipt and processing of SDUs within one or more PDUs, as described.

Figure 3:
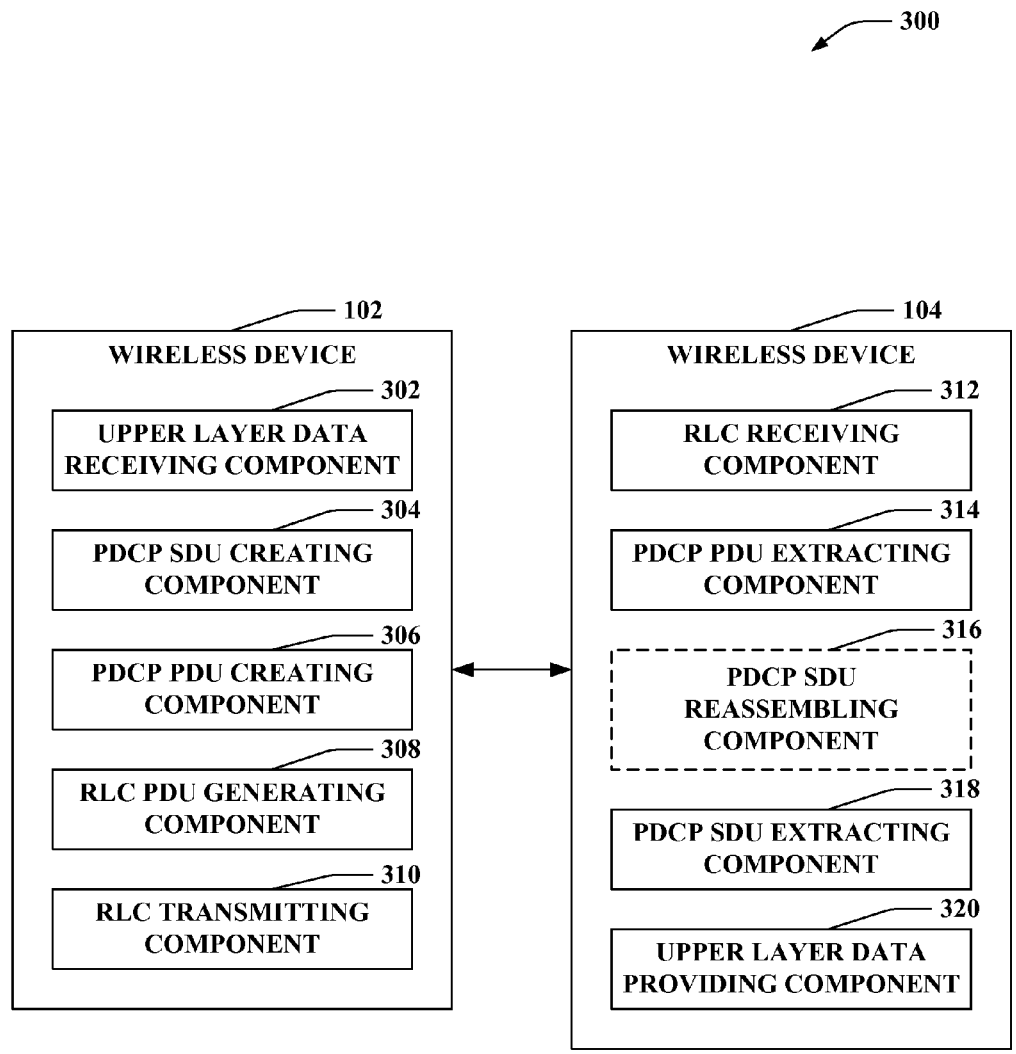
FIG. 3 illustrates an example wireless communication network that effectuates bundling and unbundling partial PDUs and processing service data units (SDU) thereof.

Now referring to FIG. 3, illustrated is a wireless communications system 300 that facilitates bundling and unbundling PDCP packets for efficient communication in a wireless network. System 300 includes a wireless device 102 that communicates with a disparate wireless device 104. As described, the wireless devices 102 and/or 104 can be substantially any type of base station or mobile device (including not only independently powered devices, but also modems, for example) that communicate to receive and/or provide access to a wireless network (not shown). Moreover, system 300 can be a MIMO system and/or can conform to one or more wireless network system specifications (e.g., EV-DO, 3GPP, 3GPP2, 3GPP LTE, WiMAX, etc.). In addition, the components and functionalities of wireless device 102 can be present in wireless device 104 and vice versa, for example, to provide similar functionality.

Wireless device 102 can comprise an upper layer data receiving component 302 that obtains packets or other data units for transmitting over a wireless network, a PDCP SDU creating component 304 that generates one or more PDCP SDUs for transmitting the packets or other data units, a PDCP PDU creating component 306 that initializes a PDCP PDU for transporting one or more PDCP SDUs, an RLC PDU generating component 308 that creates an RLC PDU for transmitting one or more PDCP PDUs or portions thereof, and an RLC transmitting component 310 that transmits the RLC PDU to one or more devices.

Wireless device 104 can include an RLC receiving component 312 that can obtain an RLC PDU from one or more wireless devices in a wireless network, a PDCP PDU extracting component 314 that can retrieve one or PDCP PDUs or portions thereof from an RLC PDU, an optional PDCP SDU reassembling component 316 that constructs a PDCP SDU from received portions thereof, a PDCP SDU extracting component 318 that obtains complete PDCP SDU packets, and an upper layer data providing component 320 that determines upper layer data comprised in the PDCP SDU packets and provides the data to one or more upper layers.

According to an example, an upper layer of wireless device 102, such as an application layer, can provide one or more packets (e.g., IP packets) to upper layer data receiving component 302. Upon determining that the packets are to be transmitted to one or more disparate wireless devices, upper layer data receiving component 302 can, in turn, provide the packets or portions thereof to PDCP SDU creating component 304. PDCP SDU creating component 304 can generate one or more PDCP SDUs for the packets. In one example, PDCP SDU creating component 304 can generate a PDCP SDU for a plurality of packets or portions thereof. PDCP PDU creating component 306 can generate a PDCP PDU comprising one or more PDCP SDUs; in an example, PDCP PDU creating component 306 can include a header in the PDCP PDU that indicates at least a sequence number of one or more PDCP SDUs in the PDCP PDU to facilitate in-order delivery and receipt of the PDCP SDUs.

RLC PDU generating component 308 can create an RLC PDU for transmitting one or more PDCP PDUs or portions over an RLC layer. In one example, RLC PDU generating component 308 can bundle a plurality of PDCP PDUs and/or portions thereof for instance, a first and last PDCP PDU in the RLC PDU can be entire PDUs or portions thereof, and other PDCP PDUs in the middle of the RLC PDU can be entire PDUs. In addition, RLC PDU generating component 308 can insert an RLC header for a given RLC PDU, which can include at least a sequence number for the RLC PDUs to facilitate in-order delivery and receipt. RLC transmitting component 310 can transmit one or more RLC PDUs to wireless device 104.

RLC receiving component 312 can obtain one or more RLC PDUs transmitted by wireless device 104, which can include one or more PDCP PDUs or portions thereof, as described. PDCP PDU extracting component 314 can retrieve one or more PDCP PDUs and/or PDU portions from the RLC PDU and provide the PDCP PDUs and/or PDU portions to PDCP SDU reassembling component 316, if present, or PDCP SDU extracting component 318 where PDCP PDU extracting component 314 reassembles the SDUs. As described, RLC PDUs can include portions of PDCP PDUs, and thus portions of PDCP SDUs. Thus, in one example, PDCP reassembling component 316 can receive a PDCP PDU portion comprising one or more PDCP SDUs or portions thereof. Where, for example, the PDCP PDU begins with a PDCP SDU portion, PDCP SDU reassembling component 316 can combine the PDCP SDU portion with a PDCP SDU portion received at the end of the previous PDCP PDU from PDCP PDU extracting component 314. Similarly, where PDCP SDU reassembling component 316 receives a PDCP SDU portion at the end of a PDCP PDU, it can retain the PDCP SDU for subsequent combination with a PDCP SDU portion heading a subsequent PDCP PDU. PDCP SDU reassembling component 316 can provide completed PDCP SDUs to PDCP SDU extracting component 316.

In another example, however, PDCP SDU reassembling component 316 is not present, and PDCP PDU extracting component 314 can provide PDCP PDUs received in RLC PDUs to PDCP SDU extracting component 318. In this example, upon receiving a PDCP PDU or portion thereof from an RLC PDU, PDCP PDU extracting component 314 can determine and provide the PDCP PDU or portion to PDCP SDU extracting component 318. Where the PDCP PDU extracting component 314 indeed extracts a PDU portion, upon extracting a next PDCP PDU portion from a next RLC PDU received by RLC receiving component 312, PDCP PDU extracting component 314 can send the complete PDCP PDU in its entirety to PDCP SDU extracting component 318. Thus, PDCP SDU extracting component 318 can first receive the PDCP PDU portion and extract any complete PDCP SDUs from the PDCP PDU, and can then receive the complete PDCP PDU extracting any PDCP SDUs therefrom for which a portion was received in the previous PDCP PDU portion. In either case, PDCP SDU extracting component 318 can provide complete PDCP SDUs to upper layer data providing component 320 for subsequent processing.

Figure 4:
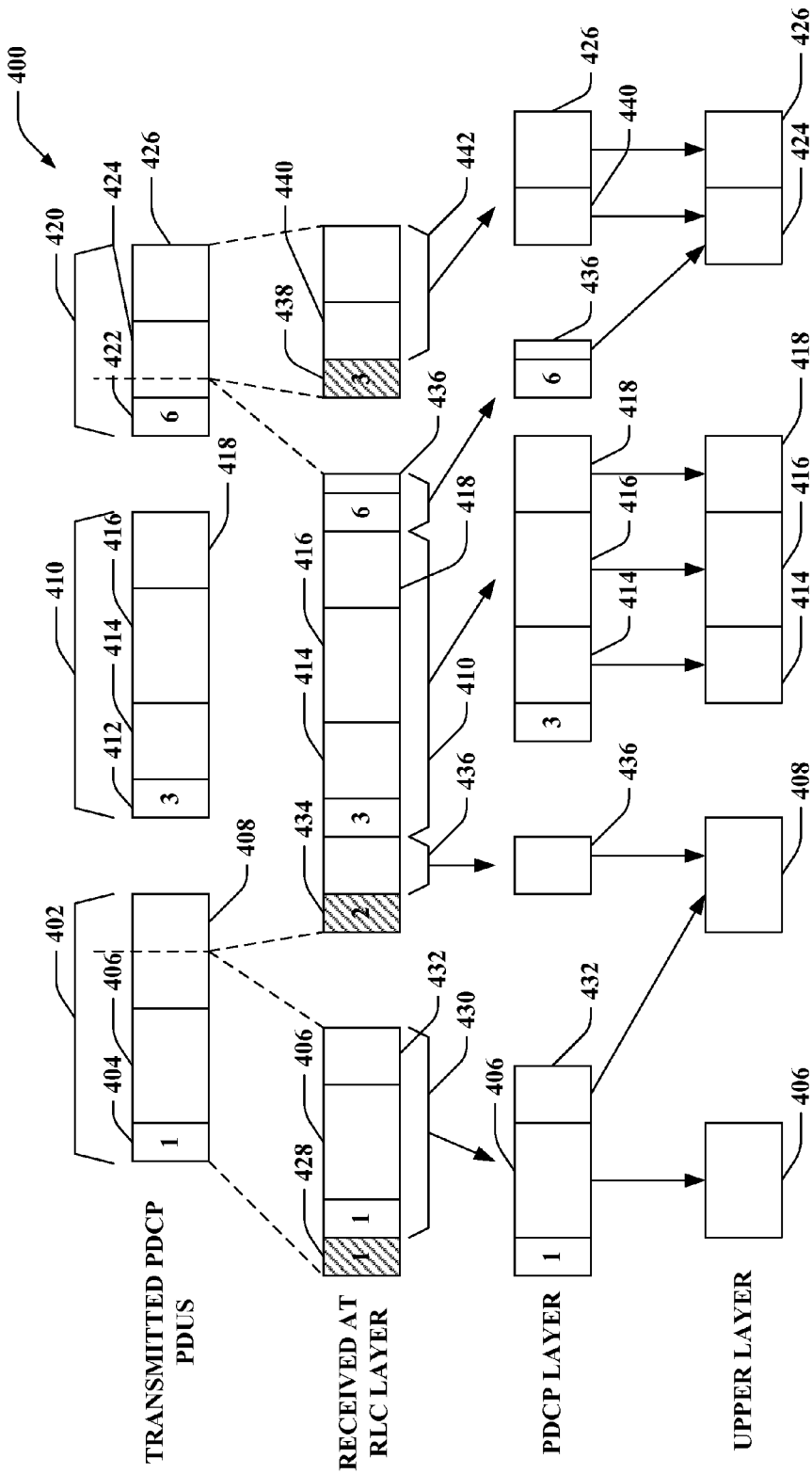
FIG. 4 illustrates an example communication flow that reassembles incomplete SDUs when remaining PDU portions are received.

Turning to FIG. 4, an example communication flow 400 among various layers in a wireless network is shown. As depicted, a PDCP PDU 402 can include a header 404 that specifies a sequence number of a first PDCP SDU 406 in the PDCP PDU 402. PDCP PDU 402 can also include another PDCP SDU 408. Similarly, PDCP PDU 410 can include a header 412 specifying a sequence number for the first PDCP SDU 414 in the PDCP PDU 410. PDCP PDU 410 can additionally comprise PDCP SDUs 416 and 418. In addition, PDCP PDU 420 can include a header 422 along with PDCP SDUs 424 and 426. In an example, PDCP PDUs 402, 410, and 420 can represent PDCP PDUs transmitted from one device to another device in a wireless network. For example, PDCP PDUs 402, 410, and 420, and/or portions thereof, can be transmitted over an RLC layer in one or more RLC PDUs, as shown.

As depicted, a portion of PDCP PDU 402 can be transmitted and received at an RLC layer (e.g., at a different device). An RLC header 428, which can comprise a sequence number for the RLC PDU, can be included with PDCP PDU portion 430 of PDCP PDU 402, as depicted. In addition, PDCP PDU portion 430 can include PDCP SDU 406 and a PDCP SDU portion 432 of PDCP SDU 408. PDCP PDU portion 430 can be forwarded to a PDCP layer, as described previously. In this example, the complete PDCP SDU 406 can be forwarded to an upper layer. Subsequently, an RLC PDU comprising a header 434, the remaining portion of PDCP PDU 402, PDCP PDU 410, and a portion of PDCP PDU 420 can be received. As described, the remaining portion of PDCP PDU 402 can be extracted and provided to a PDCP layer. The remaining PDCP SDU portion 436 of PDCP SDU 408 can be extracted from remaining portion of PDCP PDU 402 and combined with the previously received PDCP SDU portion 432 of PDCP SDU 408 to construct PDCP SDU 408. PDCP SDU 408 can be provided to an upper layer.

In addition, PDCP PDU 410 can be extracted from the RLC PDU and provided to the PDCP layer. PDCP SDUs 414, 416, and 418 can be extracted from PDCP PDU 410 and provided to an upper layer. In addition, PDCP PDU portion 436 of PDCP PDU 420 can be provided to the PDCP layer. Subsequently, an RLC PDU comprising a header 438 and PDCP PDU portion 442 of PDCP PDU 420 can be received at the RLC layer. PDCP PDU portion 442 of PDCP PDU 420 can be provided to a PDCP layer, as described. In this example, PDCP SDU portion 440 of PDCP SDU 424 can be retrieved from PDCP PDU portion 442 and combined with previously received PDCP SDU portion 436 to formulate PDCP SDU 424, which can be provided to an upper layer. In addition, PDCP SDU 426 can be provided to the upper layer. Thus, as shown, one or more PDCP PDUs, or portions thereof, can be bundled in one or more RLC PDUs to facilitate efficient receipt and processing of PDCP SDUs in the PDCP PDUs. In this regard, delay associated with waiting for completed PDCP PDUs before transmitting to devices over an RLC layer can be avoided. Once a device receives one or more PDCP PDUs or portions thereof, it can process completed PDCP SDUs in the PDCP PDUs or portions thereof while waiting for remaining portions of incomplete PDCP PDUs. Partial PDCP SDUs can be reassembled at the PDCP layer when additional portions of incomplete PDCP PDUs that include additional portions of the partial SDUs are received, in this example.

Figure 5:
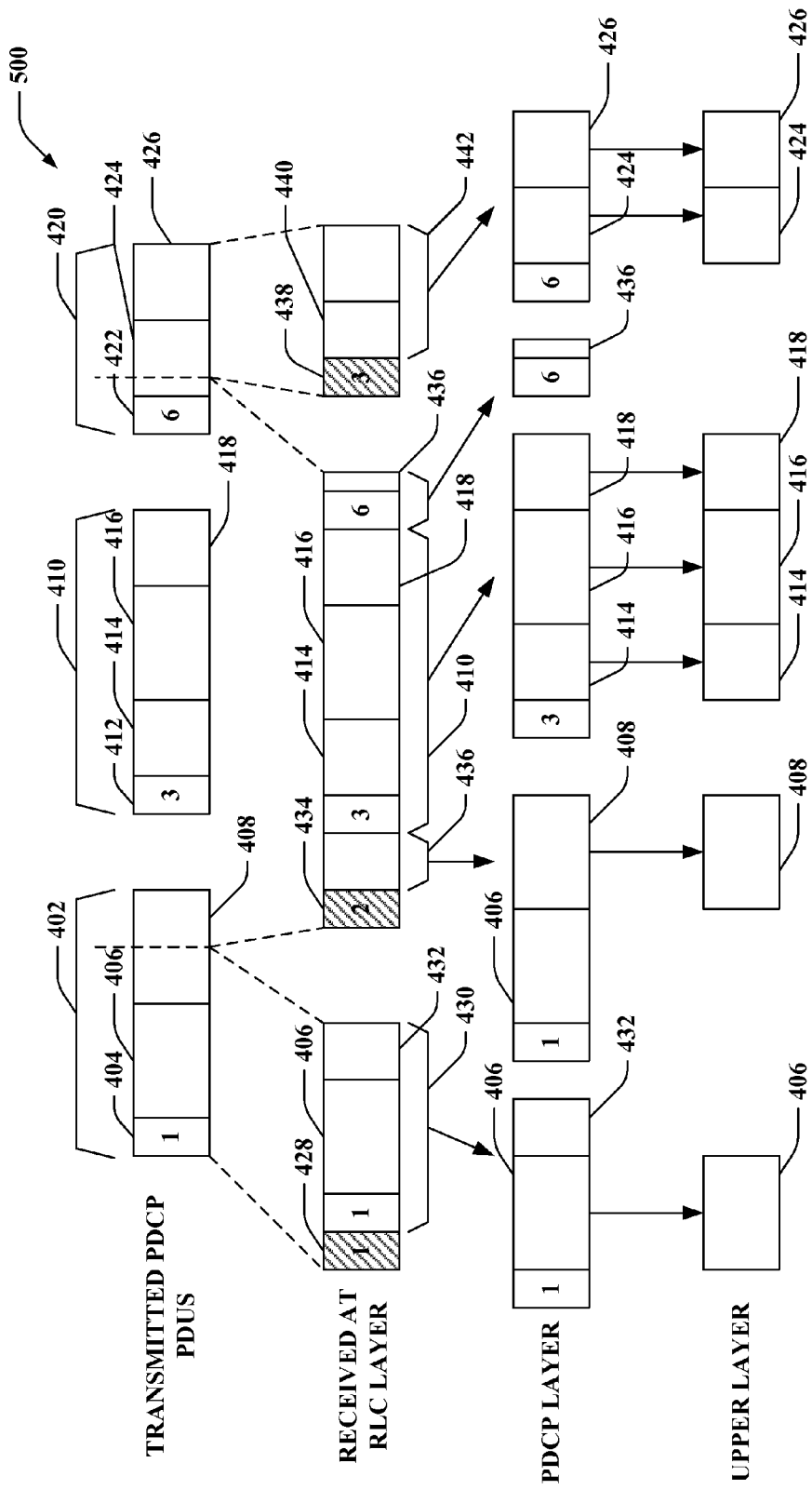
FIG. 5 illustrates an example communication flow that reassembles incomplete PDUs when remaining PDU portions are received.

Turning to FIG. 5, an example communication flow 500 among various layers in a wireless network is shown. As depicted, a PDCP PDU 402 can include a header 404 that specifies a sequence number of a first PDCP SDU 406 in the PDCP PDU 402. PDCP PDU 402 can also include another PDCP SDU 408. Similarly, PDCP PDU 410 can include a header 412 specifying a sequence number for the first PDCP SDU 414 in the PDCP PDU 410. PDCP PDU 410 can additionally comprise PDCP SDUs 416 and 418. In addition, PDCP PDU 420 can include a header 422 along with PDCP SDUs 424 and 426. In an example, PDCP PDUs 402, 410, and 420 can represent PDCP PDUs transmitted from one device to another device in a wireless network. For example, PDCP PDUs 402, 410, and 420, and/or portions thereof, can be transmitted over an RLC layer in one or more RLC PDUs.

As shown, a portion of PDCP PDU 402 can be transmitted and received at an RLC layer (e.g., at a different device). An RLC header 428, which can comprise a sequence number for the RLC PDU, can be included with PDCP PDU portion 430 of PDCP PDU 402, as depicted. In addition, PDCP PDU portion 430 can include PDCP SDU 406 and a PDCP SDU portion 432 of PDCP SDU 408. PDCP PDU portion 430 can be forwarded to a PDCP layer, as described previously. In this example, the complete PDCP SDU 406 can be forwarded to an upper layer, and the partial PDCP SDU 432 can be ignored. Subsequently, an RLC PDU comprising a header 434, the remaining portion of PDCP PDU 402, PDCP PDU 410, and a portion of PDCP PDU 420 can be received. As described, the remaining portion of PDCP PDU 402 can be extracted and combined with the previously received PDCP PDU portion 430 to formulate the complete PDCP PDU 402. The complete PDCP PDU 402 can be provided to the PDCP layer. As PDCP SDU 406 was already provided to the upper layer, PDCP SDU 408 can be extracted from the complete PDCP PDU 402 and provided to the upper layer.

In addition, PDCP PDU 410 can be extracted from the RLC PDU and provided to the PDCP layer. PDCP SDUs 414, 416, and 418 can be extracted from PDCP PDU 410 and provided to an upper layer. In addition, PDCP PDU portion 436 of PDCP PDU 420 can be provided to the PDCP layer. As the PDCP PDU portion 420 does not include a complete PDCP SDU, it can be ignored. Subsequently, an RLC PDU comprising a header 438 and PDCP PDU portion 442 of PDCP PDU 420 can be received at the RLC layer. PDCP PDU portion 442 of PDCP PDU 420 can be combined with previously received PDCP PDU portion 436 to construct the complete PDCP PDU 420. The complete PDCP PDU 420 can be provided to the PDCP layer, as described. In this example, PDCP SDUs 424 and 426 can be extracted from the complete PDCP PDU 420 and provided to an upper layer. Thus, as shown, one or more PDCP PDUs, or portions thereof, can be bundled in one or more RLC PDUs to facilitate efficient receipt and processing of PDCP SDUs in the PDCP PDUs. In this regard, delay associated with waiting for completed PDCP PDUs before transmitting to devices over an RLC layer can be avoided. Once a device receives a PDCP PDU portion, it can process completed PDCP SDUs while waiting for remaining portions of incomplete PDCP SDUs in additional portion(s) of the PDCP PDU. Partial PDCP PDUs can be reassembled at the RLC layer, in this example, so the PDCP layer can eventually receive complete PDCP PDUs without having to reassemble PDCP SDUs.

Figure 6:
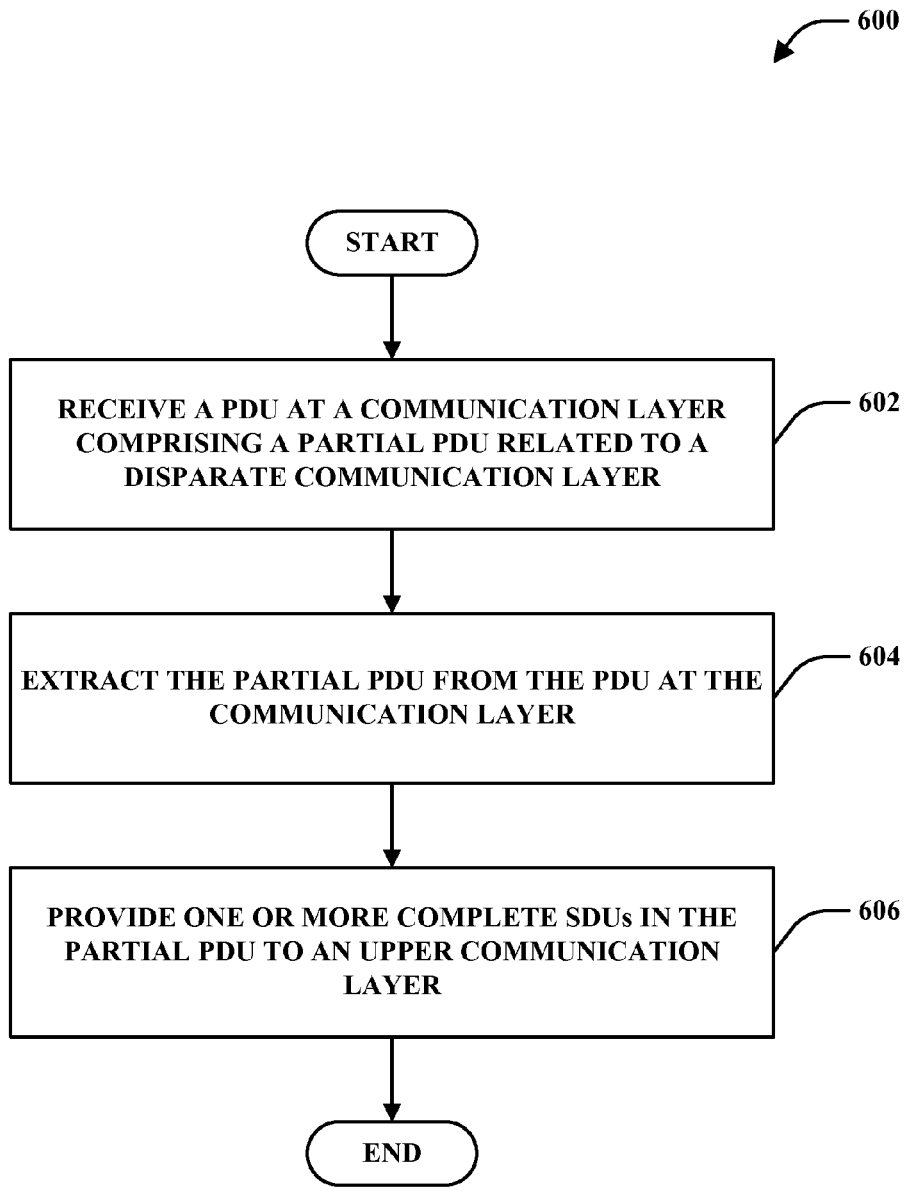
FIG. 6 is a flow diagram of an example methodology that processes partial PDUs upon receipt.
Figure 7:
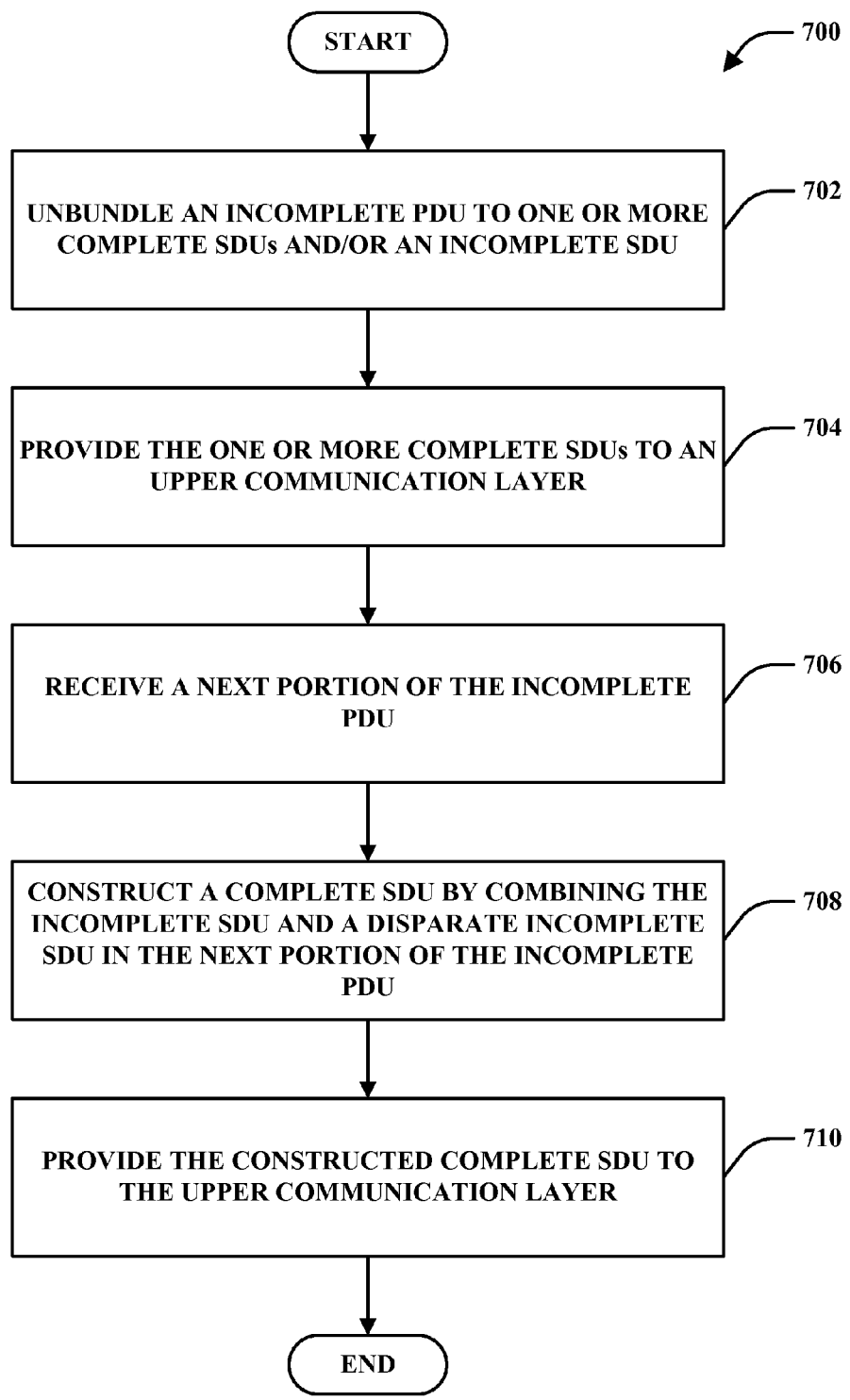
FIG. 7 is a flow diagram of an example methodology that reassembles SDUs from incomplete PDUs and received remaining portions of the incomplete PDUs.
Figure 8:
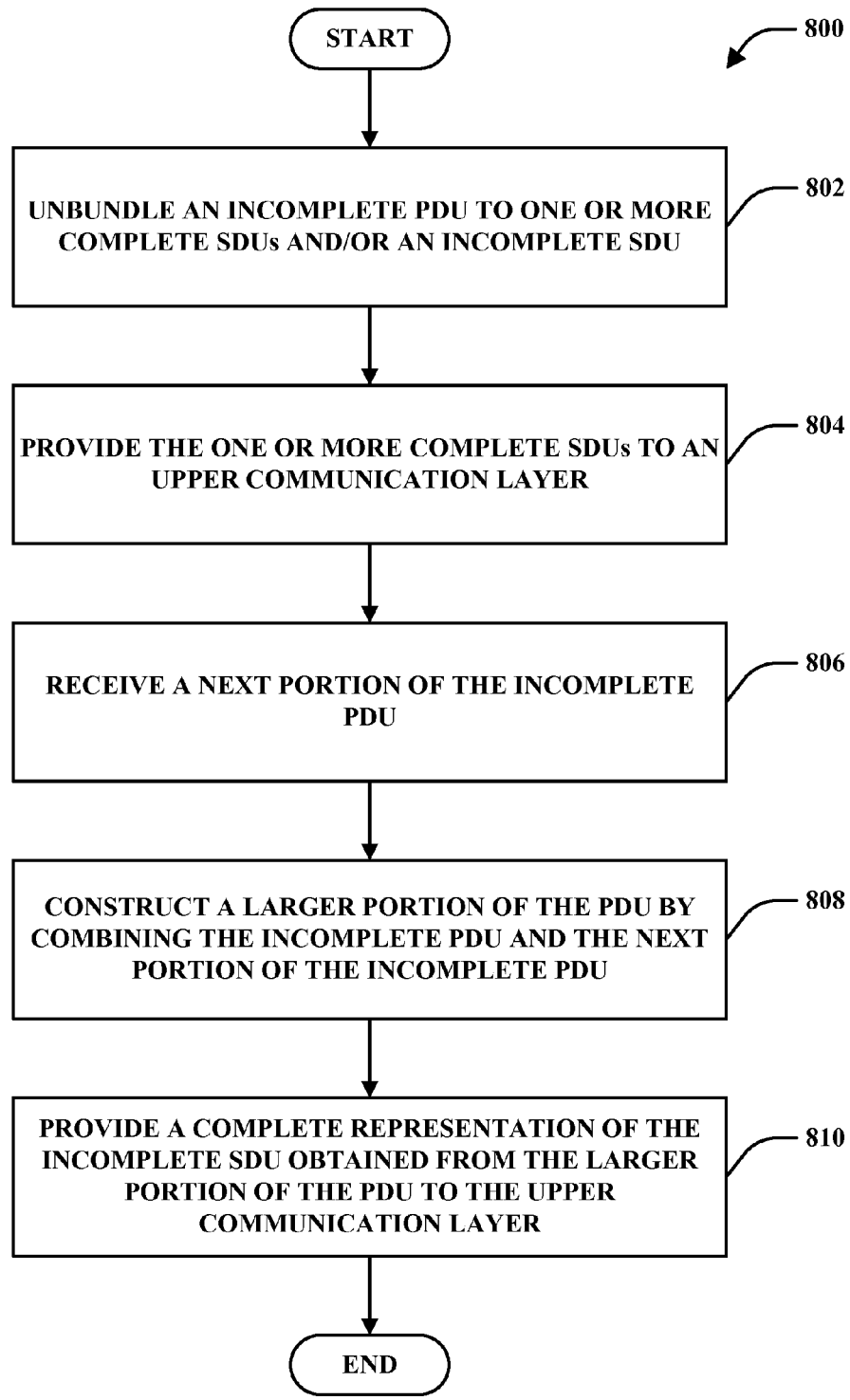
FIG. 8 is a flow diagram of an example methodology that processes incomplete PDUs and reassembles when remaining portions of the incomplete PDUs.

Referring now to FIGS. 6-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is an example methodology 600 for receiving and processing partial PDUs in wireless communications. At 602, a PDU can be received at a communication layer comprising a partial PDU related to a disparate communication layer. As described, for example, the communication layer can be an RLC layer and/or the disparate communication layer can be a PDCP layer such that an RLC PDU can comprise partial PDCP PDUs. At 604, the partial PDU can be extracted from the PDU at the communication layer. In this regard, the PDU can include one or more complete SDUs and/or a partial SDU. Thus, at 606, one or more complete SDUs in the partial PDU can be provided to an upper communication layer. Thus, the remainder of the partial PDU need not be received before one or more SDUs in the PDU can be processed. As described above, once the remainder is received, any partial SDUs completed by the remainder of the partial PDU can be provided to the upper communication layer.

Turning to FIG. 7, an example methodology 700 is illustrated that facilitates unbundling and processing partial PDUs in a wireless network. At 702, an incomplete PDU can be unbundled to one or more complete SDUs and/or an incomplete SDU portion. If one or more complete SDUs are present in the PDU, for example, at 704 the one or more complete SDUs can be provided to an upper communication layer. For example, the upper communication layer can be an application layer that processes the SDUs or contents thereof. Thus, some SDUs can be processed while waiting for the remaining portion of the incomplete PDU. At 706, a next portion of the incomplete PDU can be received. At 708, a complete SDU can be constructed by combining the incomplete SDU and a disparate incomplete SDU in the next portion of the incomplete PDU. In one example, the next portion of the incomplete PDU can be a remaining portion of the PDU. In addition, for example, the remaining portion of the PDU can be received along with one or more additional PDUs or portions thereof. The constructed complete SDU can be provided to the upper communication layer at 710.

With reference to FIG. 8, illustrated is an example methodology 800 for unbundling and processing partial PDUs in a wireless network. At 802, an incomplete PDU can be unbundled to one or more complete SDUs and/or an incomplete SDU. If one or more complete SDUs are present in the PDU, for example, at 804 the one or more complete SDUs can be provided to an upper communication layer. For example, the upper communication layer can be an application layer that processes the SDUs or contents thereof. Thus, some SDUs can be processed while waiting for the remaining portion of the incomplete PDU. At 806, a next portion of the incomplete PDU can be received. At 808, a larger portion of the PDU can be constructed by combining the incomplete PDU and the next portion of the incomplete PDU. A complete representation of an incomplete SDU obtained from the larger portion of the PDU can be provided to the upper communication layer at 810. In one example, the complete representation of the SDU can be extracted from the larger portion of the PDU. Thus, SDUs received in the incomplete PDU can be processed upon receipt, and previously incomplete SDUs in the incomplete PDU can be processed upon receiving the next portion of the incomplete PDU. In one example, the next portion of the incomplete PDU can be a remaining portion of the PDU. In addition, for example, the remaining portion of the PDU can be received along with one or more additional PDUs or portions thereof.

It will be appreciated that, in accordance with one or more aspects described herein, inferences can be made regarding bundling or unbundling PDUs, reassembling SDUs, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
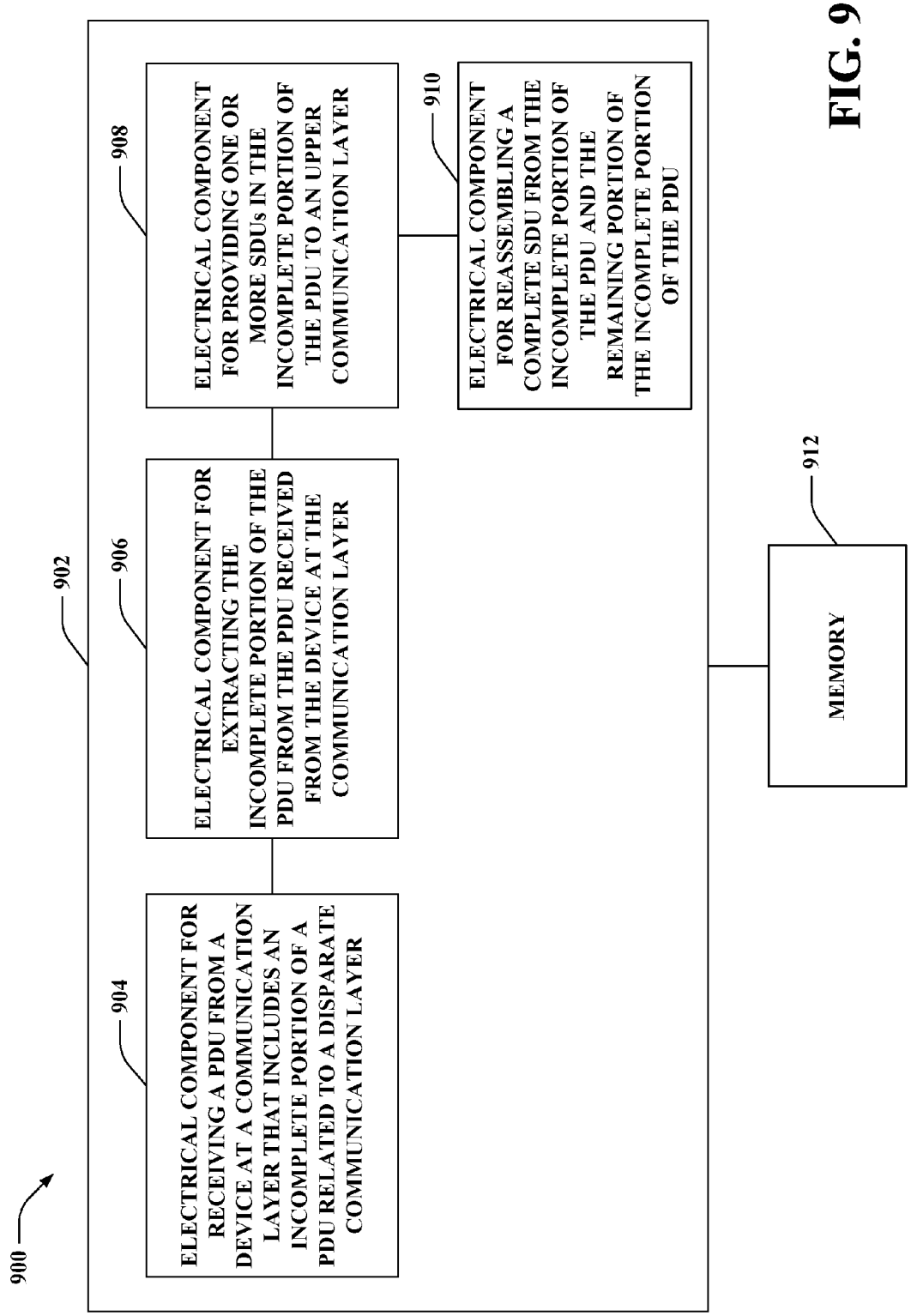
FIG. 9 is a block diagram of an example apparatus that facilitates processing partial PDUs without waiting for a remaining portion.

With reference to FIG. 9, illustrated is a system 900 that processes incomplete portions of PDUs received in a wireless network. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a PDU from a device at a communication layer that includes an incomplete portion of a PDU related to a disparate communication layer 904. As described, in one example, the communication layer can be an RLC layer and the disparate communication layer can be a PDCP layer. Further, logical grouping 902 can comprise an electrical component for extracting the incomplete portion of the PDU from the PDU received from the device at the communication layer 906. In this regard, as described, processing can begin for the incomplete portion of the PDU before receiving the remainder.

Moreover, logical grouping 902 includes an electrical component for providing one or more SDUs in the incomplete portion of the PDU to an upper communication layer 908. As described, electrical component 908 can provide only complete SDUs to the upper communication layer. In addition, electrical component 904 can also receive a remaining portion of the incomplete portion of the PDU. In addition, logical grouping 902 can also include an electrical component for reassembling a complete SDU from the incomplete portion of the PDU and the remaining portion of the incomplete portion of the PDU 910. For example, the incomplete portion of the PDU can include a portion of an SDU (e.g., at the end of the PDU), and the remaining portion of the PDU can include the remaining portion of the SDU (e.g., at the beginning of the remaining portion of the PDU). The SDU portions can be combined to construct the complete SDU, for example.

Furthermore, as described, electrical component 908 can provide the reassembled SDU to the upper communication layer; thus, SDUs in the incomplete PDU can be processed while waiting for the remainder of the PDU, and once the remainder is received, a partial SDU that spans the incomplete portion and the remainder can be constructed and provided to the upper communication layer. In addition, in one example, rather than electrical component 910 reassembling PDUs, electrical component 906 can reassemble the PDU and provide the complete PDU (or a larger portion) to electrical component 908 for providing complete SDUs that were not complete in the incomplete portion of the PDU to the upper communication layer. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
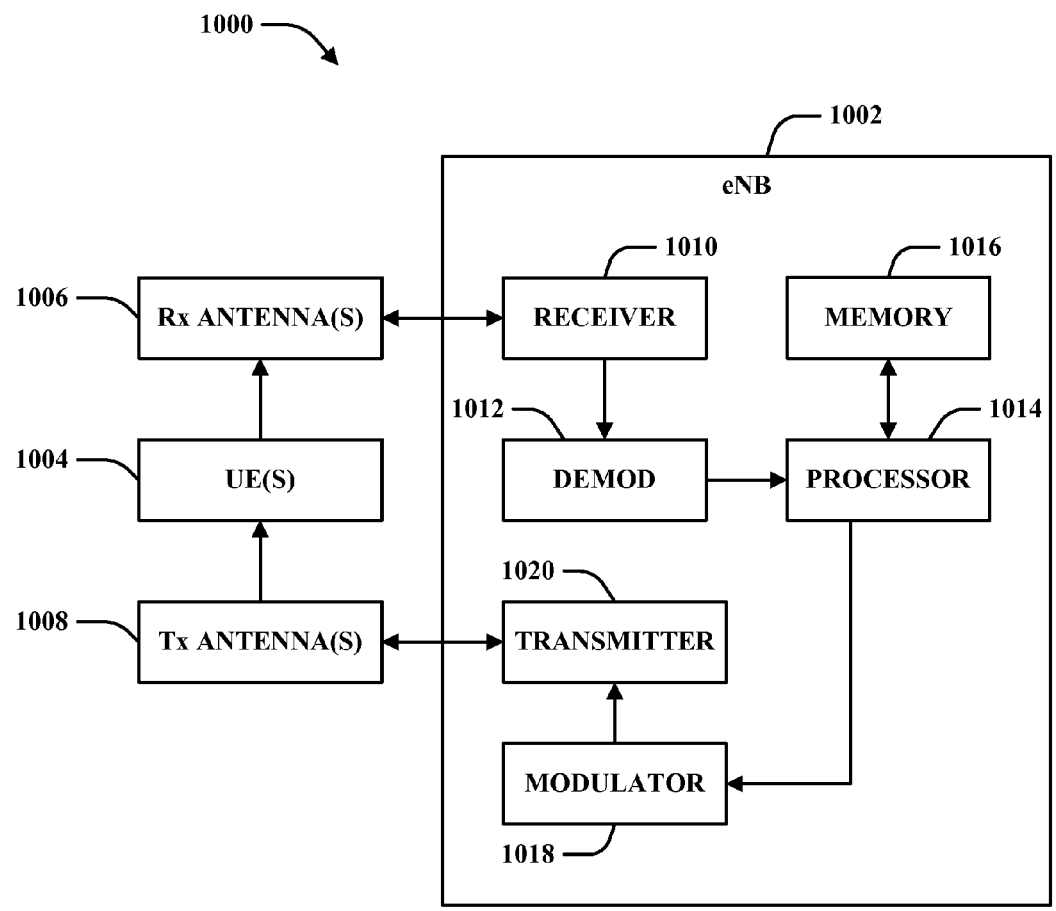
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or eNB 1002. As illustrated, eNB 1002 can receive signal(s) from one or more UEs 1004 via one or more receive (Rx) antennas 1006 and transmit to the one or more UEs 1004 via one or more transmit (Tx) antennas 1008. Additionally, eNB 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, eNB 1002 can employ processor 1014 to perform methodologies 600, 700, 800, and/or other similar and appropriate methodologies. eNB 1002 can also include a modulator 1018 that can multiplex a signal for transmission by a transmitter 1020 through transmit antenna(s) 1008.

Figure 11:
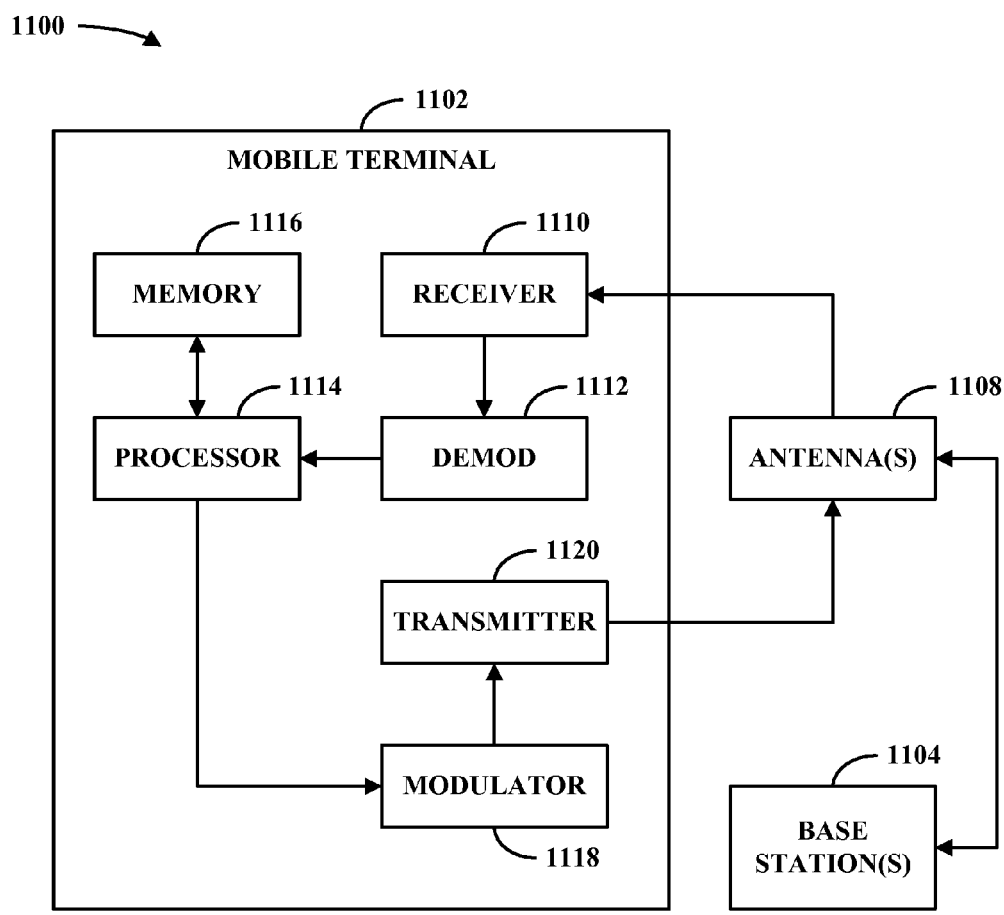

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 600, 700, 800, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
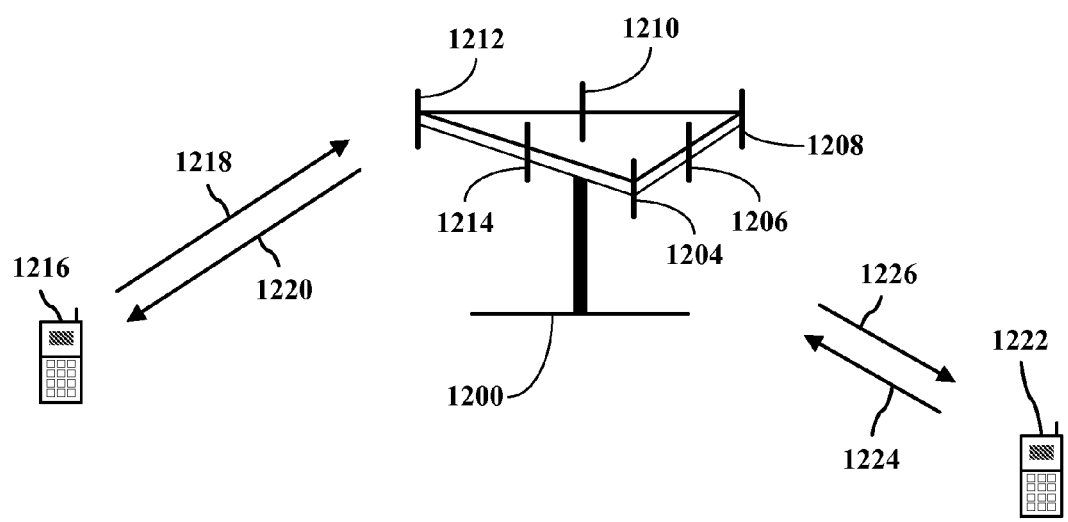
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
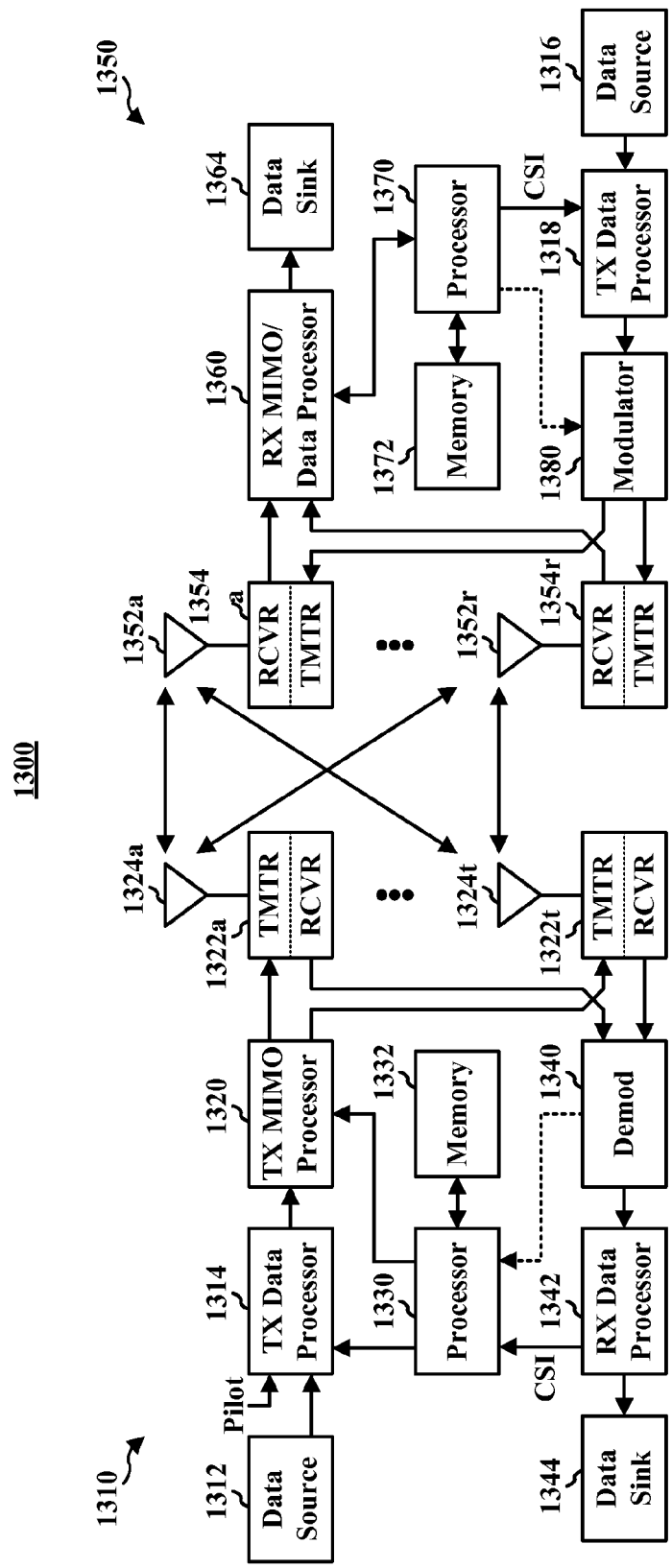
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   at a first communication layer:
      receiving a first packet data unit (PDU), the first PDU including a first partial PDU of a second communication layer, the first partial PDU comprising a first complete service data unit (SDU) and a first SDU portion, the first communication layer being different from the second communication layer;
      extracting the first partial PDU from the first PDU;
      providing the first partial PDU to the second communication layer;
      receiving a second PDU, the second PDU including a second partial PDU of the second communication layer, the second partial PDU comprising a second SDU portion;
      extracting the second partial PDU from the second PDU; and
      providing the second partial PDU to the second communication layer; and
   at the second communication layer:
      assembling a second complete SDU by combining at least the first SDU portion and the second SDU portion; and
      providing the first complete SDU to an upper communication layer prior to completing the assembling of the second complete SDU.

2. The method of claim 1, wherein the second partial PDU is part of a same SDU as the first partial PDU, and the second partial PDU is greater in size than the first partial PDU.

3. The method of claim 2, further comprising reassembling a combined PDU from the first partial PDU and the second partial PDU, the combined PDU being a complete PDU or a third partial PDU.

4. The method of claim 3, in which the second complete SDU is from the combined PDU.

5. The method of claim 1, wherein the first communication layer is a radio link control (RLC) layer and the second communication layer is a packet data convergence protocol (PDCP) layer.

6. The method of claim 1, wherein the first PDU further includes at least one complete PDU of the second communication layer.

7. A wireless communications apparatus, comprising:
   a memory unit; and
   at least one processor coupled to the memory unit, the at least one processor configured:
      to obtain a first packet data unit (PDU) from a device at a first communication layer, the first PDU including a first partial PDU of a second communication layer, the first partial PDU comprising a first complete service data unit (SDU) and a first SDU portion, the first communication layer being different from the second communication layer;
      to extract the first partial PDU from the first PDU at the first communication layer;
      to provide the first partial PDU from the first communication layer to the second communication layer;
      to receive a second PDU from the device at the first communication layer, the second PDU including a second partial PDU of the second communication layer at the first communication layer, the second partial PDU comprising a second SDU portion;

to extract the second partial PDU from the second PDU at the first communication layer;

to provide the second partial PDU from the first communication layer to the second communication layer;

to assemble a second complete SDU at the second communication layer by combining at least the first SDU portion and the second SDU portion; and to provide the first complete SDU from the second communication layer to an upper communication layer prior to completing the assembling of the second complete SDU.

8. The wireless communications apparatus of claim 7, wherein the at least one processor is further configured to construct a combined PDU from the first partial PDU and the second partial PDU, the combined PDU being a complete PDU or a third partial PDU.

9. The wireless communications apparatus of claim 8, wherein the second complete SDU is from the combined PDU.

10. The wireless communications apparatus of claim 7, wherein the first communication layer is a radio link control (RLC) layer and the second communication layer is a packet data convergence protocol (PDCP) layer.

11. The wireless communications apparatus of claim 7, wherein the first further includes at least one complete PDU of the second communication layer.

12. An apparatus, comprising:
means for receiving a first packet data unit (PDU) at a first communication layer, the first PDU including a first partial PDU of a second communication layer, the first partial PDU comprising a first complete service data unit (SDU) and a first SDU portion, the first communication layer being different from the second communication layer;
means for extracting the first partial PDU from the first PDU at the first communication layer;
means for providing the first partial PDU from the first communication layer to the second communication layer;
means for receiving a second PDU at the first communication layer, the second PDU including a second partial PDU of the second communication layer, the second partial PDU comprising a second SDU portion;
means for extracting the second partial PDU from the second PDU at the first communication layer;
means for providing the second partial PDU from the first communication layer to the second communication layer;
means for assembling a second complete SDU at the second communication layer by combining at least the first SDU portion and the second SDU portion; and
means for providing the first complete SDU from the second communication layer to an upper communication layer prior to completing the assembling of the second complete SDU.

13. The apparatus of claim 12, wherein the second partial PDU is part of a same SDU as the first partial PDU, and the second partial PDU is greater in size than the first partial PDU.

14. The apparatus of claim 13, wherein the means for extracting further includes means for reassembling a combined PDU from the first partial PDU and the second partial PDU, the combined PDU being a complete PDU or a third partial PDU.

15. The apparatus of claim 14, wherein the second complete SDU is from the combined PDU.

16. The apparatus of claim 12, wherein the first communication layer is a radio link control (RLC) layer and the second communication layer is a packet data convergence protocol (PDCP) layer.

17. The apparatus of claim 12, wherein the first PDU further includes at least one complete PDU of the second communication layer.

18. A computer program product, comprising:
a computer-readable medium having non-transitory program code recorded thereon, the program code configured:
to receive a first packet data unit (PDU) at a first communication layer, the first PDU including a first partial PDU of a second communication layer, the first partial PDU comprising a first complete service data unit (SDU) and a first SDU portion, the first communication layer being different from the second communication layer;
to extract the first partial PDU from the first PDU at the first communication layer;
to provide the first partial PDU from the first communication layer to the second communication layer;
to receive a second PDU at the first communication layer, the second PDU including a second partial PDU of the second communication layer, the second partial PDU comprising a second SDU portion;
to extract the second partial PDU from the second PDU at the first communication layer;
to provide the second partial PDU from the first communication layer to the second communication layer;
to assemble a second complete SDU by combining at least the first SDU portion and the second SDU portion; and
to provide the first complete SDU from the second communication layer to an upper communication layer prior to completing the assembling of the second complete SDU.

19. The computer program product of claim 18, wherein the second partial PDU is part of a same SDU as the first partial PDU, and the second partial PDU is greater in size than the first partial PDU.

20. The computer program product of claim 19, wherein the program code further comprises to reassemble a combined PDU from the first partial PDU and the second partial PDU, the combined PDU being a complete PDU or a third partial PDU.

21. The computer program product of claim 20, wherein the second complete SDU is from the combined PDU.

22. The computer program product of claim 18, wherein the first communication layer is a radio link control (RLC) layer and the second communication layer is a packet data convergence protocol (PDCP) layer.

23. The computer program product of claim 18, wherein the first PDU further includes at least one complete PDU of the second communication layer.

24. An apparatus, comprising:
a packet data unit (PDU) receiving component configured to obtain a first PDU from a device at a first communication layer, the first partial PDU comprising a first complete service data unit (SDU) and a first SDU portion, the first PDU including a partial PDU of a second communication layer, the first communication layer being different from the second communication layer;
a PDU unbundling component configured:
to extract the first partial PDU from the first PDU at the first communication layer;

to provide the first partial PDU from the first communication layer to the second communication layer;

to receive a second PDU at the first communication layer, the second PDU including a second partial PDU of the second communication layer, the second partial PDU comprising a second SDU portion;

to extract the second partial PDU from the second PDU at the first communication layer;

to provide the second partial PDU from the first communication layer to the second communication layer;

to assemble a second complete SDU at the second communication layer by combining at least the first SU portion and the second SDU portion; and to provide the first complete SDU from the second communication layer to an upper communication layer prior to completing the assembling of the second complete SDU.

25. The apparatus of claim 24, wherein the second partial PDU is part of a same SDU as the first partial PDU, and the second partial PDU is greater in size than the first partial PDU component.

26. The apparatus of claim 25, wherein the PDU unbundling component is further configured to assemble a combined PDU from the first partial PDU and the second partial PDU, the combined PDU being a third partial PDU or a complete PDU.

27. The apparatus of claim 24, wherein the second complete SDU is from the combined PDU.

28. The apparatus of claim 24, wherein the first communication layer is a radio link control (RLC) layer and the second communication layer is a packet data convergence protocol (PDCP) layer.

29. The apparatus of claim 24, wherein the first PDU further includes at least one complete PDU of the second communication layer.

30. The wireless communications apparatus of claim 7, wherein the second partial PDU is part of a same SDU as the first partial PDU, and the second partial PDU is greater in size than the first partial PDU.

* * * * *